United States Patent [19]
Kapsales

[11] Patent Number: 5,627,875
[45] Date of Patent: May 6, 1997

[54] METHOD IN A TELEPHONE SYSTEM FOR REACHING A SUBSCRIBER UNDER BUSY/NO ANSWER CONDITIONS AND RING/NO ANSWER CONDITIONS

[75] Inventor: Peter Kapsales, Woodinville, Wash.

[73] Assignee: AT&T, Middletown, N.J.

[21] Appl. No.: 691,300

[22] Filed: Aug. 1, 1996

Related U.S. Application Data

[63] Continuation of Ser. No. 569,552, Dec. 8, 1995, abandoned, which is a continuation of Ser. No. 344,306, Nov. 22, 1994, abandoned.

[51] Int. Cl.⁶ .................................................. G04M 3/48
[52] U.S. Cl. .................. 379/57; 379/142; 379/209; 379/211; 379/221
[58] Field of Search .................. 379/57, 67, 88, 379/89, 201, 207, 211, 217, 58, 209, 219, 220, 221, 62, 63, 127, 142

[56] References Cited

U.S. PATENT DOCUMENTS

| | | | |
|---|---|---|---|
| 4,277,649 | 7/1981 | Sheinbein | 379/201 |
| 4,313,035 | 1/1982 | Jordan | 379/207 |
| 5,199,062 | 3/1993 | Van Meister et al. | 379/67 |
| 5,276,731 | 1/1994 | Arbel et al. | 379/88 |
| 5,327,486 | 7/1994 | Wolff et al. | 379/211 |
| 5,329,578 | 7/1994 | Brennan et al. | 379/201 |
| 5,375,162 | 12/1994 | Kim et al. | 379/211 |
| 5,392,342 | 2/1995 | Rosenthal | 379/211 |

OTHER PUBLICATIONS

European Patent Apln., Publication No. 0 498 593 A–2 to Krishman et al., Published Aug. 12, 1992.

*Primary Examiner*—Krista M. Zele
*Assistant Examiner*—Scott Wolinsky
*Attorney, Agent, or Firm*—Robert B. Levy

[57] ABSTRACT

A method for use in a telephone system, permitting a caller connected to a central platform to further attempt to reach a subscriber after the central platform initially attempted to establish a connection with the subscriber by dialing the subscriber's number and the subscriber's telephone was detected as being in either a Busy/No answer (BNA) condition or a Ring/No answer (RNA) condition at the subscriber's telephone station. Upon detection of either a BNA or RNA condition, a determination is then made as to whether an option associated with the detected condition is available for the subscriber. If an option is available and is selected by the caller, the subscriber is paged and the initial attempt to establish a connection with the subscriber from the platform is terminated. The caller is then informed of the progress of the further attempt to reach the subscriber by prerecorded messages associated with the detected condition. The subscriber is then redialed by the central platform, saving the expense of a separate telephone call.

8 Claims, 3 Drawing Sheets

METHOD IN A TELEPHONE SYSTEM FOR REACHING A SUBSCRIBER UNDER BUSY/NO ANSWER CONDITIONS AND RING/NO ANSWER CONDITIONS

This application is a continuation of application Ser. No. 08/569,552, filed Dec. 8, 1995, now abandoned, which is a continuation of application Ser. No. 08/344,306, filed Nov. 22, 1994, now abandoned.

TECHNICAL FIELD

This invention relates to personal communications and, more particularly, to a method in a telephone system of reaching a subscriber under Busy/No Answer (BNA) and Ring/No Answer (RNA) conditions.

BACKGROUND OF THE INVENTION

Personal communication service (PCS) is a service in which subscribers, rather than locations or telephone stations, are assigned a personal telephone number. Calls placed to a subscriber's personal telephone number are routed to the subscriber at a telephone near that subscriber's current location. In order to provide a subscriber with such a personal communication service, e.g., as disclosed in U.S. Pat. No. 4,313,035, issued to Jordan, et al, the system providing the service (PCS system) must be supplied with the telephone number of a telephone near the subscriber's current location to which it should route calls placed to his personal telephone number. Each time the subscriber changes his location, the telephone number to which calls placed to his personal telephone number are routed must be changed. This requires the subscriber to call into the PCS system and to supply the telephone number to which his calls should currently be routed. Constantly having to call in to the PCS system can be tiresome, and supplying a ten-digit telephone number each time a subscriber changes his location is cumbersome.

To overcome these drawbacks, one prior art solution is to program a sequence of telephone numbers at any one of which the personal telephone service subscriber might be reached. The telephone numbers in a sequence are typically those of locations where a person is likely to be at various times throughout the day, such as "home," "car phone," "office," "pager," etc. When a call is made to the subscriber's personal telephone number, the PCS system attempts to complete the call by sequentially routing the call to each telephone number of the sequence. This process continues until: (a) the call is answered; (b) the call is abandoned; (c) the line associated with the telephone number is determined to be busy; or (d) until a predetermined period of time has elapsed. However, requiring the sequence of calls to be set by the subscriber in advance, and being the same for all callers, is inflexible.

Certain existing systems also offer a method for bridging a call to a subscriber when there is no answer, or when the subscriber's line is busy. In these systems, a subscriber is paged (or notified using other communication methods) when the phone reached is either busy, or not answered. In this way, a subscriber knows that there is a call waiting for him, or her, and the subscriber can then either put the current caller on hold (busy situation), or move to another phone (no answer situation), call a central platform, and the new incoming call is bridged to the phone from which the subscriber has called the central platform. Such a system is being trialed by AT&T, which system is identified as Personal Research Service™.

The problem with this feature is that an extra call is necessary to connect the subscriber to the new caller, that being the call from the subscriber to the central platform. The subscriber must pay for this extra call, which may double the expense for the communication between the subscriber and the new caller.

The instant invention solves this problem.

SUMMARY OF THE INVENTION

The instant invention provides a method which permits a caller connected to a central platform to further attempt to reach a subscriber after the central platform initially attempted to establish a connection with the subscriber by dialing the subscriber's number, the subscriber's telephone was detected as being in a BNA or RNA condition and the initial connection was terminated. A BNA condition is detected at the central platform upon receiving a busy indicating signal from subscriber's telephone. A RNA condition is detected after a number of rings, when the subscriber does not answer. The caller then has the option of continuing the attempt to reach the subscriber, or choosing an alternative communications sequence such as voice mail, E Mail, etc.

If the caller chooses to continue the attempt to reach the subscriber under the RNA or BNA, a page is directed to the subscriber which notifies the subscriber that the caller has chosen to continue to try to reach the subscriber. Prior to the renewed attempts the initial attempt to establish a connection between the central platform and the subscriber is terminated.

After the caller is informed that an attempt is being made to reach the subscriber, the subscriber's number is redialed by the central platform.

If the subscriber answers after the redial, the central platform completes the connection between the caller and the subscriber. Alternatively, if the subscriber does not answer, the caller is informed and the call is either terminated, or the call is directed to an alternative communications sequence. The call may also be prompted for a third redial attempt.

It is an advantage and general feature of the invention that breaking the connection between the central platform and the subscriber, and then redialing the subscriber permits a BNA or RNA solution at much less expense then existing systems. It also places the full cost of the call on the caller (unless an 800 number is dialed).

DETAILED DESCRIPTION

Figure 1:
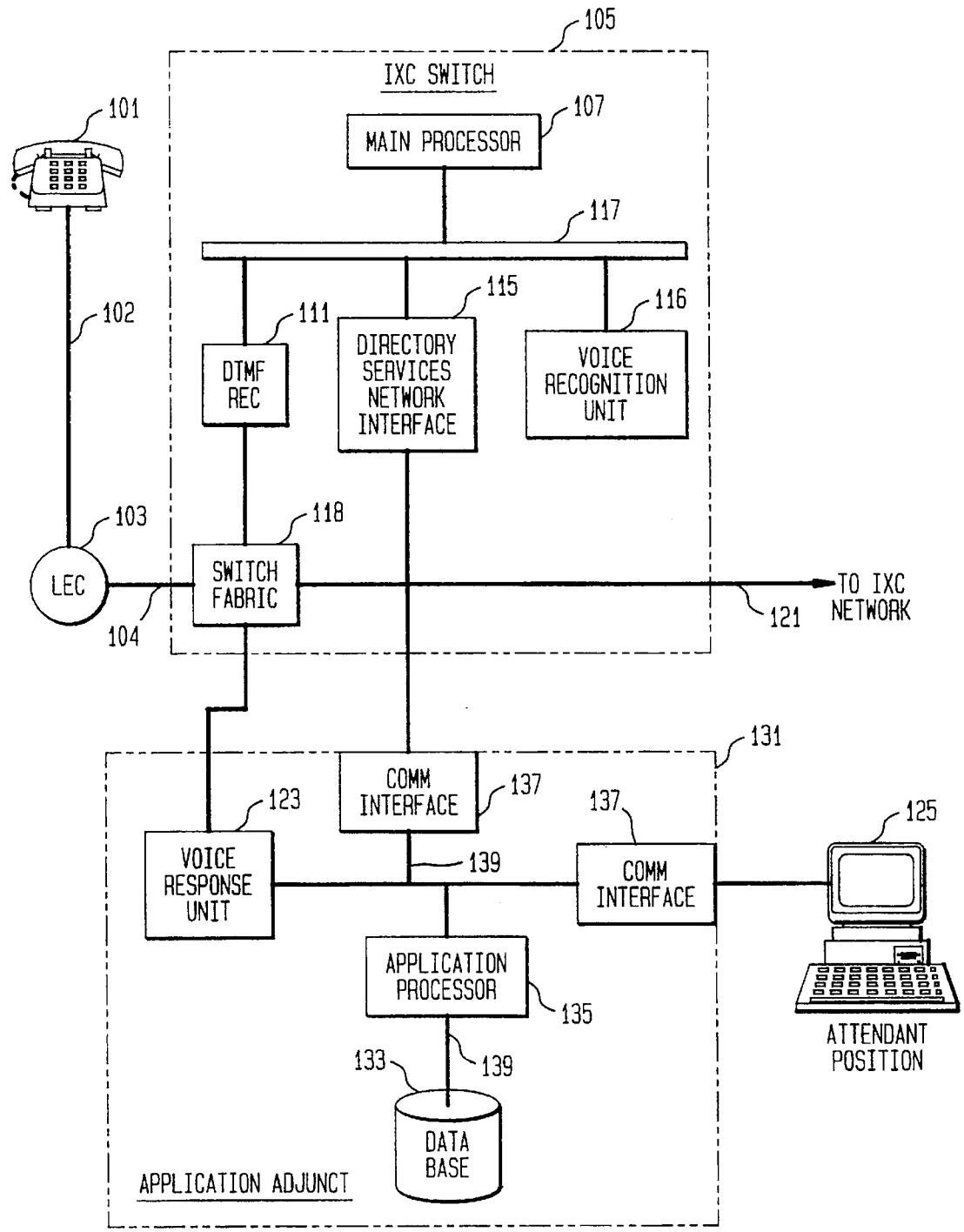
FIG. 1 shows an exemplary embodiment of a system for providing personal communication services in accordance with the principles of the invention.

Referring now to FIG. 1, there is shown an exemplary embodiment of a PCS system in accordance with the principles of the invention. Shown are: (a) telephone station 101, from which calls to a personal telephone number, or any other number, may be originated or received; (b) telephone line 102, of telephone station 101; (c) local exchange carrier (LEC) 103; (d) IXC switch 105; (e) application adjunct 131; and (f) attendant position 125.

Application adjunct 131 performs the necessary processing for: (1) storing an association between (a) a telephone number, (b) a pre-defined, mnemonic tag, and (c) a corresponding identifier; (2) developing and storing sequences of telephone numbers for PCS calls, which may be referred to herein as "quick sequences;" (3) associating quick sequences with the telephone numbers of potential calling telephones; and (4) supplying the telephone numbers of destinations to which IXC switch 105 should handle a call placed to a subscriber's personal telephone number, in accordance with the principles of the invention. Application adjunct 131 includes: (a) application processor 135; (b) data base 133; (c) voice response unit 123; and (d) communication interfaces 137. Application processor 135 controls the overall operation of application adjunct 131 by performing any necessary processing and exchanging messages with the other components of application adjunct 131 over links 139. Links 139 convey information in digital form and need not all be of the same type or speed, e.g., one may be ethernet link, while the others may be RS-232C links. Data base 133 stores the information required by application processor 135 to control application adjunct 131, e.g., program code and data.

Voice response unit 123 can make various announcements which can be heard by the calling party. The information necessary for making announcements, or combinative portions thereof, may be prestored in voice response unit 123. Such combinative portions may include caller instruction messages for use during call placement, e.g., "press 1 to talk to your party; press 2 to leave a voice mail message, etc.", and other announcements to be described below. In one embodiment, the announcements are accessed by supplying voice response unit 123 with pointers to them. Voice response unit 123 is connected to switch fabric 118, so that the announcements may be routed to subscribers connected to application adjunct 131.

Communication interface 137 translates information for communication between application adjunct 131, and devices external to application adjunct 131. Attendant position 125, staffed by a human attendant, interfaces with application adjunct 131 to handle any questions that a subscriber or caller may have, or any problems that may arise.

IXC switch 105 includes: (a) main processor 107; (b) dual tone multi-frequency receiver (DTMF REC) 111; (c) directory services network interface 115; (d) bus 117; (e) switch fabric 118, and (f) optional voice recognition unit 116. Main processor 107 controls the overall operation of IXC switch 105 by performing any necessary processing and exchanging messages with the other components of IXC switch 105 over bus 117. Dual tone multi-frequency receiver (DTMC REC) 111 receives dual tone multi-frequency signals that are transmitted in response to the pressing of keys on the keypad of telephone station 101, and supplies the digit corresponding to each pressed key to main processor 107. IXC switch 105 also receives the caller's ANI from LEC 103 in the conventional manner.

Directory services network interface 115 is a protocol conversion unit that permits IXC switch 105 to communicate with application adjunct 131. It is responsible for formatting all messages transmitted to, and for extracting responses received from, application adjunct 131. Such messages include: (a) a message from IXC switch 105, indicating the ANI of the calling telephone; and (b) a message from application adjunct 131, indicating which destination telephone number the PCS call should presently be routed to. In one embodiment, the link between directory services network interface 115, and application adjunct 131, uses the well-known X.25 protocol.

Switch fabric 118 can connect the trunk on which the subscriber's call arrived at IXC switch 105, e.g., trunk 104 to: (a) dual tone multi-frequency receiver (DTMF REC) 111; (b) voice recognition unit 116; (c) voice response unit 123; or (d) to the rest of the interexchange carrier's network, via link 121. Some of the purposes of such connections are described further below.

In one embodiment of the invention, for ease of use and administration, each telephone number to which PCS calls can be routed to is stored in association with a pre-defined, mnemonic tag, and a corresponding identifier. Table 1 shows an exemplary list of such tags and their corresponding identifiers. In this embodiment, Table 1 is stored in data base 133. Table 1 may be implemented as an array in which the tags are the elements of the array and the identifiers are the corresponding indices into the array. Text-to-speech conversion may be used to speak the tags or, alternatively, there may also be stored pointers to information representing stored speech for each tag. The information representing speech may be stored in voice response unit 123, as noted.

TABLE 1

| TAG | IDENTIFIER |
| --- | --- |
| Home | 01 |
| Office | 02 |
| Secretary | 03 |
| Car Phone | 04 |
| Wife | 05 |
| Husband | 06 |
| AT&T Voice Mail | 07 |
| AT&T Voice Mail With Pager | 08 |
| AT&T Pager | 09 |
| Spouse | 10 |
| Roommate | 11 |
| Children | 12 |
| Neighbor | 13 |
| Mother | 14 |
| Father | 15 |
| Parents | 16 |

Table 2 shows an exemplary table in which identifiers are associated with telephone numbers for a particular PCS subscriber having a unique personal telephone number. In one exemplary embodiment, the telephone numbers are stored in data base 133, as elements of an array, one array for each subscriber, and the identifiers are the corresponding indices into the array. The array may be stored in a compressed form.

TABLE 2

| IDENTIFIER | TELEPHONE # |
| --- | --- |
| 01 | 5559742211 |
| 02 | 5559497777 |
| 03 | 5559492211 |
| 04 | 5554152219 |
| 05 | |
| 06 | |
| 07 | 8005558100 |
| 08 | 8005554444 |
| 09 | 8005552312 |
| 10 | |
| 11 | |

TABLE 2-continued

| IDENTIFIER | TELEPHONE # |
| --- | --- |
| 12 | 2213861599 |
| 13 | |
| 14 | 8334429181 |
| 15 | |
| 16 | |

The stored associations between tags and telephone numbers are used to create a sequence of locations to which the calls to a subscriber's personal telephone number should be routed. Again, such a sequence of destinations is known as "quick sequence." Each of a subscriber's quick sequences has a quick sequence identified which is a unique designation.

Data base 133 is also used to store various options available to the subscriber or the calling party. The instant invention is a method of using either a Busy/No answer (BNA) or Ring/No answer (RNA) option, which allows the caller to continue an attempt to reach a subscriber under a BNA or RNA condition. Upon detection of a BNA or RNA condition by the central platform, consisting of IXC switch 105 and application adjunct 131, the caller is advised whether the BNA or RNA option is available as described below. Should the caller choose this option, the method of the instant invention proceeds as will be described.

Figure 2A:
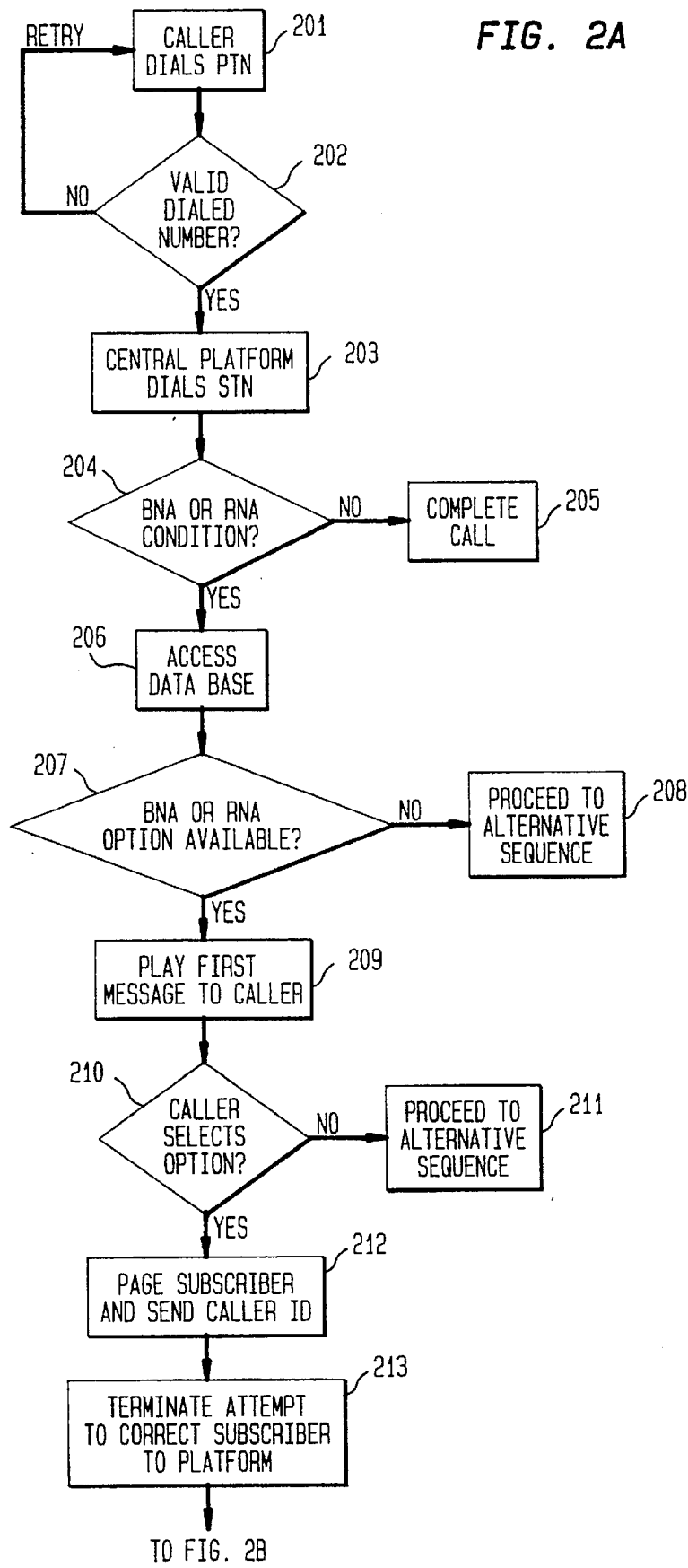
FIGS. 2A and 2B show a flow chart of an exemplary process for providing personal telecommunication services, wherein the caller has the possibility of reaching a subscriber after a Busy/No answer or Ring/No answer condition has been detected.
Figure 2B:
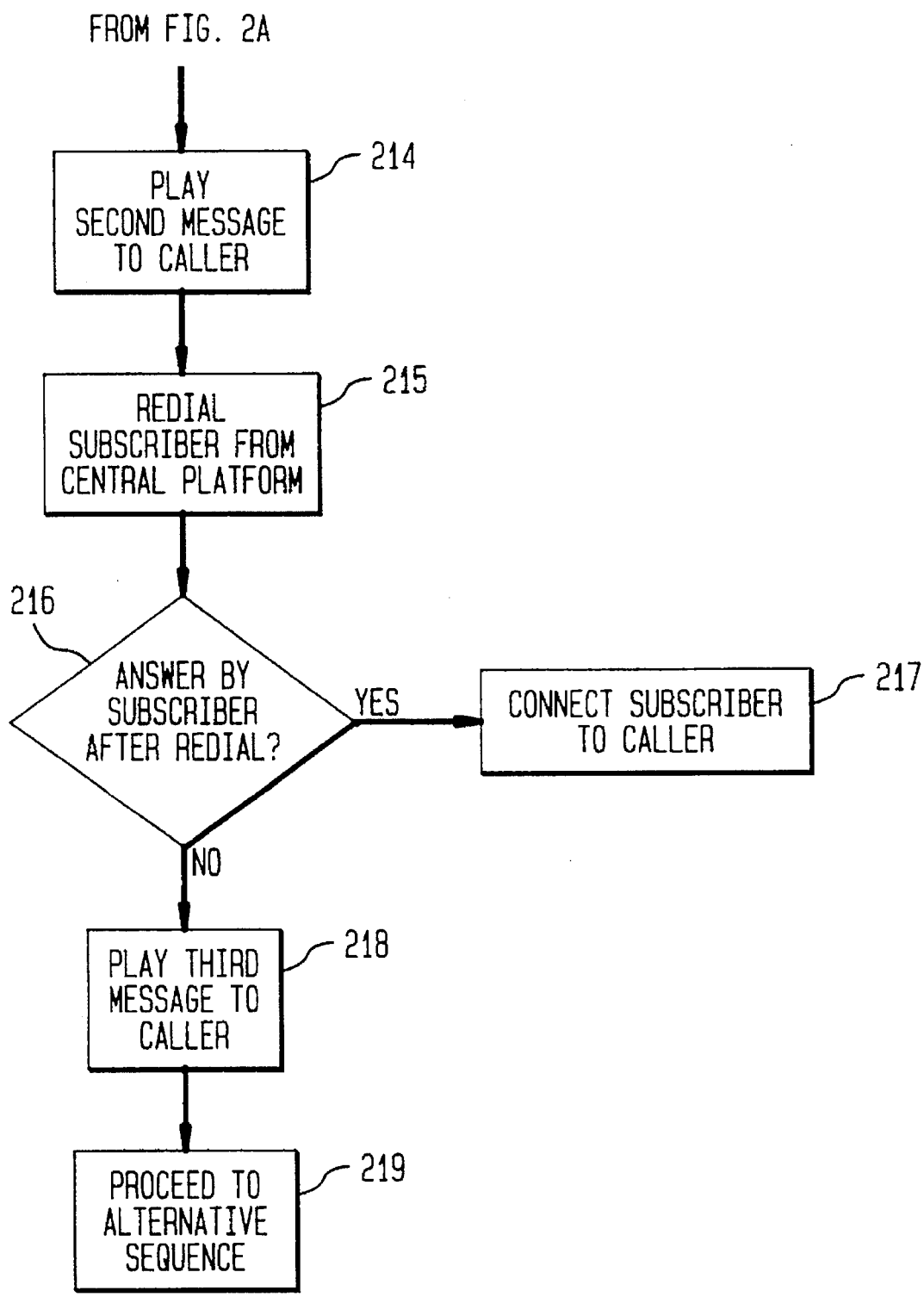

Referring now to FIGS. 2A and 2B, there is shown a flow chart of an exemplary process for providing personal telecommunication services in accordance with the principles of the instant invention.

As described above, the system shown in FIG. 1 can route calls to a series of locations in order to reach a subscriber. However, an additional problem exists in which each location reached by a subscriber is either busy, because the subscriber is on the telephone with a third party, i.e. the subscriber is engaged in a first call or there is no answer. As also described above, existing systems can solve this problem, but existing solutions result in essentially doubling the cost of such a feature due to the necessity for the subscriber to make an extra call to a central platform.

The instant invention solves this problem by breaking the connection with the subscriber's phone when it is either busy or there is no answer, paging the subscriber, (or using some other communication method) and then redialing the subscriber's phone. Upon receiving the page, the subscriber then has the option of reaching his phone if he is nearby (no answer situation), or terminating the first call (busy situation), and waiting for his phone to be redialed.

It is, of course, understood that the page to the subscriber will preferably use the ANI identification feature so that the subscriber will be able to determine the priority of the new incoming call.

Referring now to FIG. 2A, the inventive sequence begins with a caller placing a call by dialing a personal telephone number (PTN) of a particular subscriber at step 201. The validity of the dialed PTN is determined at step 202. If the dialed PTN is determined not to be valid, the caller is given the option of redialing the number. If the dialed number is determined to be valid, the central platform dials a subscriber telephone number (STN) associated with the PTN at step 203. It is then determined whether a BNA or RNA condition exists at step 204. If it is determined that a BNA or RNA condition does not exist (i.e. the call is answered), the caller is connected to the particular subscriber at step 205. If either a BNA or RNA condition is detected, data base 133 is accessed at step 206 and a determination as to whether a BNA or RNA option is available for the particular subscriber is made at step 207. If it is determined that a BNA or RNA options not available, the method proceeds to an alternative sequence at step 208, such as a default sequence, which is preset by the subscriber, where, for example, the caller could be directed to voice mail, E mail, etc., or the call could be terminated. If a BNA or RNA option is available, the method proceeds to step 209, where a first message will be played to the caller by voice response unit 123.

For a BNA condition, an example of a first message to be played is: "Your party is busy, press 1 now if you want to interrupt your party, otherwise, please hold to leave a message."

For a RNA condition, an example of a first message to be played is: "Your call has not been answered, press 1 if you want to attempt to locate your party through paging." If the subscriber is near his phone when receiving the page as described below, the subscriber has the option of returning rapidly to his phone to receive the redial that will be coming shortly. Alternatively, the subscriber would also have the option of storing in the data base a location of a second phone where the subscriber could be reached for the RNA condition. This, of course, could include the number for a cellular phone.

Proceeding to step 210, the caller then has the option of pressing 1 to select the BNA or RNA option. If the caller chooses not to select this option, the method proceeds to step 211 where, for example, the call could be routed to an alternative sequence, such as being placed on hold to leave a message, or utilize voice mail, E mail, fax, etc.

If the caller chooses the BNA or RNA option by pressing "1", the subscriber will be paged at step 212. Immediately thereafter, at step 213, the attempt to connect between the central platform and the subscriber is terminated.

The page to the subscriber will normally be accompanied by an ANI identification number, such that the subscriber can judge the priority of the incoming call. It is estimated that such a page will take ten to thirty seconds for the page to reach the subscriber.

During this period, a second message is played to the caller at step 214, referring now to FIG. 2B. Such a message, for example, could be: "We are trying to see if your party can end their phone call quickly. Please hold for a few seconds." That message, of course, would be applicable for a BNA condition.

An alternative second message applicable for a RNA condition would be: "We are trying to locate your party as his or her phone has not been answered. Please hold for a few seconds."

After the foregoing message is played to the caller, the subscriber is then redialed by the central platform that received the original call at step 215 It is estimated that the total elapsed time between the party first being advised that the subscriber was either busy, or was not answering, would be approximately thirty seconds. This period would normally give the subscriber a chance to terminate the preceding call if he was at that location, or alternatively to return to his phone, if he was in a location near the phone were the call was originally placed.

After the subscriber is redialed, it is determined whether the subscriber answers the call of step 216. If the subscriber does answer, the method moves to step 217, where the central platform connects the subscriber to the caller. If there is no answer after the redial, the method moves to step 218, where a third message will be played to the caller, such as: "We are sorry, your party could not interrupt their phone call. Please hold to leave a message." That message would obviously be played for a BNA condition. Alternatively, the third message to be played for a RNA condition would be, for example, "We are sorry, your party cannot be located. Please hold to leave a message." After the third message is played, the method would then proceed to step 219, where the caller would be directed to an alternative communications sequence, or the call would be terminated.

It is, of course, understood that a third redial option may also be made available before the call is terminated.

The foregoing merely illustrates the principles of the invention. It will, thus, be appreciated that those skilled in the art will be able to devise various arrangements which, although not explicitly described or shown herein, embody the principles of the invention and are, thus, within its spirit and scope.

What is claimed is:

1. A method for use in a telephone system permitting a caller connected to a central platform to attempt to reach a subscriber under a Busy/No answer condition at the subscriber's telephone station, said method comprising the steps of:

placing a call to said subscriber by dialing said subscriber's telephone station from said central platform;

detecting at said central platform a Busy/No answer condition at said subscriber's telephone station;

determining whether a Busy/No answer option is available for said subscriber;

if said Busy/No answer option is available, informing said caller of said Busy/No answer condition and providing to said caller the option of paging said subscriber;

if said caller elects said option, paging said subscriber by said central platform and providing a caller identification number to said subscriber;

terminating said call; and redialing said subscriber's telephone station from said central platform.

2. A method in accordance with claim 1, wherein said informing step includes the step of giving the caller the option of continuing the attempt to reach the subscriber's telephone station.

3. A method in accordance with claim 2, wherein the call from the caller is terminated if the caller does not choose said option of continuing the attempt to reach the subscriber's telephone station.

4. A method in accordance with claim 1, further including the step of playing a prerecorded message to the caller at the time said Busy/No answer condition is detected.

5. A method in accordance with claim 4, further including the step of connecting the subscriber's telephone station to the caller if the subscriber answers in response to redialing the subscriber's telephone station.

6. A method in accordance with claim 5, further including the step of providing an alternative sequence of communications to the caller if the subscriber does not answer in response to redialing the subscriber's telephone station.

7. A method in accordance with claim 2, further including the step of allowing the subscriber to select the number of attempts that a caller will be allowed.

8. A method for use in a telephone system permitting a caller connected to a central platform to attempt to reach a subscriber under a Ring/No answer condition at the subscriber's telephone station, said method comprising the steps of:

placing a call to said subscriber by dialing said subscriber's telephone station from said central platform;

detecting at said central platform a Ring/No answer condition at said subscriber's telephone station;

determining whether a Ring/No answer option is available for said subscriber; if said Ring/No answer option is available, informing said caller of said Ring/No answer condition and providing to said caller the option of paging said subscriber;

if said caller elects said option, paging said subscriber by said central platform and providing a caller identification number to said subscriber;

terminating said call; and redialing said subscriber's telephone station from said central platform.

* * * * *